United States Patent [19]

Ancarani Restelli

[11] Patent Number: 5,328,414
[45] Date of Patent: Jul. 12, 1994

[54] ELECTROMECHANICAL BICYCLE TRANSMISSION

[75] Inventor: Amedeo Ancarani Restelli, Cernusco Lombardone, Italy

[73] Assignee: Societa Italiano Cantene Calibrate Regina S.P.A., Milan, Italy

[21] Appl. No.: 972,928

[22] Filed: Nov. 6, 1992

[30] Foreign Application Priority Data

Nov. 18, 1991 [IT] Italy .................. MI 91 A 003068

[51] Int. Cl.5 .................................. F16H 59/00
[52] U.S. Cl. ............................................ 474/80
[58] Field of Search .............. 474/69, 70, 77–82; 280/238

[56] References Cited

U.S. PATENT DOCUMENTS 3,919,891  11/1975  Stuhlmuller et al. .......... 474/81 X
4,894,046  1/1990   Browning ..................... 474/80 X
4,946,425  8/1990   Buhlmann ..................... 474/80

Primary Examiner—Thuy M. Bui
Attorney, Agent, or Firm—Stevens, Davis, Miller & Mosher

[57] ABSTRACT

An electromechanical bicycle transmission (10) comprises an electric motor (16) controlling through a first rigid mechanism (29) the movement of a first element (28) connected through preloaded yielding springs (24,25) to a second movement element (21) through another rigid mechanism (18,19,20) of a sprocket change mechanism member (11) moving to engage a transmission chain (12) opposite a predetermined sprocket of a plurality of coaxial sprockets (13) of different diameters.

23 Claims, 4 Drawing Sheets

ELECTROMECHANICAL BICYCLE TRANSMISSION

BACKGROUND OF THE INVENTION

The present invention relates to an electromechanical bicycle transmission.

In the art of the bicycle the structure of a transmission with sprockets in which a sprocket change mechanism shifts the chain upon command onto a selected sprocket of a plurality of sprockets of different diameters arranged concentrically and integral through an idling gear system with the rear wheel is well known.

Although generally the sprocket change mechanism is controlled by the cyclist through a control lever connected thereto through a cable there have been proposed electromechanical devices in which the sprocket change mechanism is operated substantially in simulation of the movement of the lever, through a gearmotor in turn operated on command of the cyclist by means of push buttons located on the handlebar. Such embodiments are however not popular because of the peculiar operation through which the sprocket change mechanisms shift the chain among the various sprockets and which makes unsatisfactory the simple replacement of the lever by an electric motor. Indeed, in a transmission using a sprocket change mechanism it can happen that during passage between the sprockets the sprocket change mechanism encounters temporary high resistances. For example, a necessary condition for correct gear shifting is that the pedals be operated for the entire duration of the transition between the sprockets to ensure correct engagement between the destination sprocket and the chain links. Irregularities or temporary interruption of pedalling during shifting leads to the rise of the above mentioned resistances in the movement of the transmission.

In manual shifting, the cyclist perceives through the mechanical connection of the lever the changes in resistance opposed by the chain to movement of the transmission and is thus able to control pedalling and the operation of the lever. With known electromechanical gear shifting devices such a feedback through the lever is completely lacking and hence, during shifting, the gearmotor often works for a period of time of variable length under conditions of excessive resistance and this can bring errors of positioning, wear and failure. In addition, the shift takes place with low speed and accuracy. These defects have until now limited the use of electromechanical transmissions in cycling.

SUMMARY OF THE INVENTION

The general purpose of the present invention is to overcome the above shortcomings by supplying an electromechanical transmission which would always perform the shift synchronously with instances of less resistance avoiding the need for the motor to overcome unforeseen increases in resistance in the movement of the gear shifting device.

In view of the above purpose it has been sought to provide in accordance with the present invention an electromechanical bicycle transmission of the type comprising a moving sprocket change mechanism to engage a motion transmission chain opposite a predetermined sprocket of a plurality of coaxial sprockets of different diameters characterized in that it comprises an electric motor controlling through a first rigid mechanism a first element connected through preloaded yielding means to a second element for shifting of the sprocket change mechanism through another rigid mechanism for movement thereof between end positions corresponding to engagement of the chain with the first and the last sprockets of the plurality.

BRIEF DESCRIPTION OF THE DRAWINGS

To clarify the explanation of the innovative principles of the present invention and its advantages compared with the known art there is described below with the aid of the annexed drawings a possible embodiment by way of non limiting example applying said principles. In the drawings.

DESCRIPTION OF THE PREFERRED EMBODIMENTS

Figure 1:
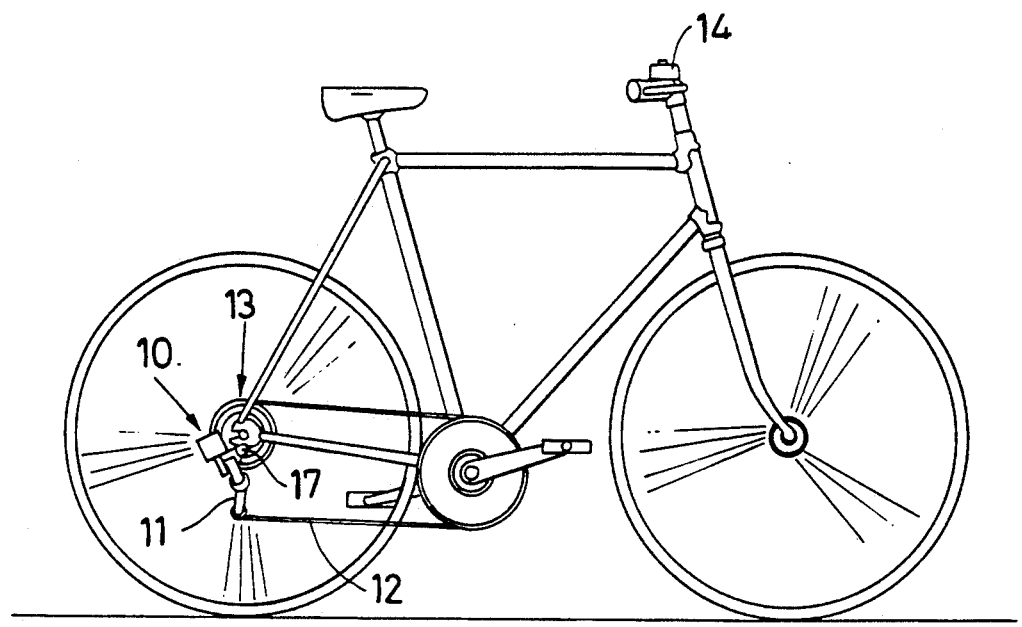
FIG. 1 shows a schematic side view of a bicycle using an electromechanical transmission in accordance with the present invention.
Figure 2:
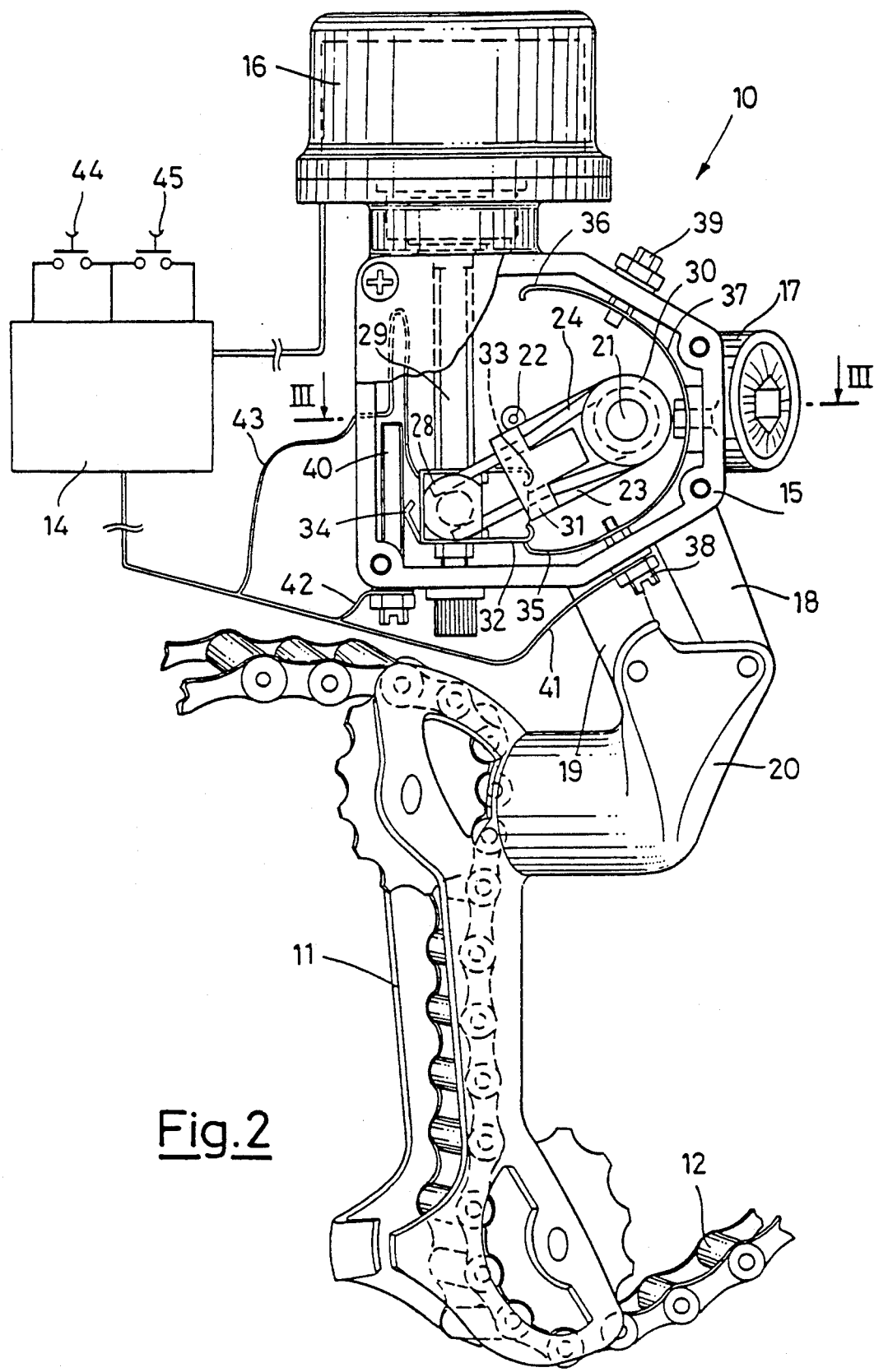
FIG. 2 shows an enlarged schematic partial cutaway view of a first embodiment of an electromechanical transmission in accordance with the present invention.

With reference to the figures FIG. 1 shows schematically a bicycle to which is applied an electromechanical transmission 10 having a sprocket change mechanism 11 to guide a chain 12 among sprockets 13 having different diameters. The electromechanical transmission 10 is controlled by an electronic device 14 arranged, for example, on the handlebar of the bicycle in an easily accessible position for the cyclist's fingers. FIG. 2 shows an enlarged partial cross section of a first possible embodiment of the electromechanical transmission 10.

As may be seen in said FIG. the electromechanical transmission 10 comprises a boxed body 15 to which is fixed an electric motor 16 optionally enclosed in a sealed case. As clarified below, the motor 16 can advantageously be of the stepped type. The boxed body 15 has a support 17 for fixing to the bicycle frame and supports on shafts along the axes of the shafts 21, 22 two arms 18, 19 to whose other ends is pivoted an element 20 to form a parallelogram for movement of the sprocket change mechanism 11.

In accordance with the known art the sprocket change mechanism 11 can be supported elastically to maintain chain tension. The elastic support is not shown since it is easily imaginable for one skilled in the art. While the shaft 22 of the arm 19 rotates freely, the shaft 21 of the arm 18 is integral with a lever element 23 in the body 15. As may be seen in FIG. 3, the lever 34 supports U springs 24, 25 coiled around the shaft 21 and with end arms extended substantially parallel to engage in seats 26, 27 in an element or carriage with a nut screw 28 travelling on a worm 29 driven by the motor 16. The worm 29 has one end projecting from the body of the transmission mechanism to supply an operating knob for possible manual control of the transmission mechanism. The lever element 23 comprises a 'reel' part 30 and a part with central strikers 31 to guide and hold in position the springs 24, 25.

Upon appropriate powering of the motor the carriage 28 moves along the worm 29 and the lever element 23 entrained by the springs 24 and 25 engaged in the carriage rotates the shaft 21 by a corresponding angle. In this manner, the parallelogram formed by the arms 19 and 18 and the element 20 moves and shifts the sprocket change mechanism 11 with a movement similar to that of the manual shift mechanisms of the known art.

To supply position information to the circuit 14 the carriage 29 supports electrical contacts 32, 33, 34 connected together. The contacts 32, 33 are arranged to enter in connection with respective elastic ends 35, 36 of an arched spring element 37 insulated electrically from the cover 15 when the carriage is near one of the ends of the worm 29. The exact position of the ends 35 and 36 is adjustable by means of the screws 38, 39.

The contact 34 is shaped to rest elastically on the stem of a screw 40 screwed through the cover 15 but electrically insulated from said cover and extending parallel to the drive worm 29. The length of the screw 40 is such that its free end is arranged near the half way point of the travel of the carriage 28 on the worm 29. The exact position of said free end is adjustable by screwing in or out the screw 40.

By means of a conductor 41, for example fixed to the screw 38, the spring 37 is electrically connected to the control device 14 just as the screw 40 through a conductor 42 and the contacts 32, 33, 34 through a flexible conductor 43 are connected to said device, permitting movement of the carriage. In this manner when the carriage is at one of the two ends of the operating worm 29 there is electrical connection between the conductors 41 and 43. In addition, between the end position shown in FIG. 2 and the position with the carrige at mid position on the worm 29, there is electrical connection between the conductors 42 and 43. Hence, if the device 14 detects an electrical connection between the conductors 41, 43 and simultaneously between the electrical conductors 42, 43 it means the carriage is in the end position shown in FIG. 2. But if the device 14 detects an electrical connection only between the conductors 41, 43 it means the carriage is in the opposite end position. Finally, if the device 14 detects the creation or the elimination of an electrical connection between the conductors 42, 43 it means that the carriage is transiting through the center line of the worm 29. The device 14 is thus capable of accurately determining the extreme end of travel positions and any intermediate position of the carriage 28.

By using a stepped motor the information from the limit switches combined for greater safety with the information of passage through the center line of the worm 29 permits accurate control of the position of the carriage at any time as is easily imagined by one skilled in the art. The device 14, which is essentially a control circuit with cabled or programmed logic such as a microcontroller for movement of a stepped motor to take it to the predetermined position, of known art and therefore not further shown nor described, can thus control the motor 16 so as to cause a discrete number of predetermined positions, each corresponding to engagement of the chain 12 with one of the sprockets 11, to reach the transmission.

To manually control passage between said predetermined positions the device 14 has two push buttons 44, 45 operated by the cyclist, one to control shifting to the larger sprockets and one to control shifting to the smaller sprockets.

Figure 4:
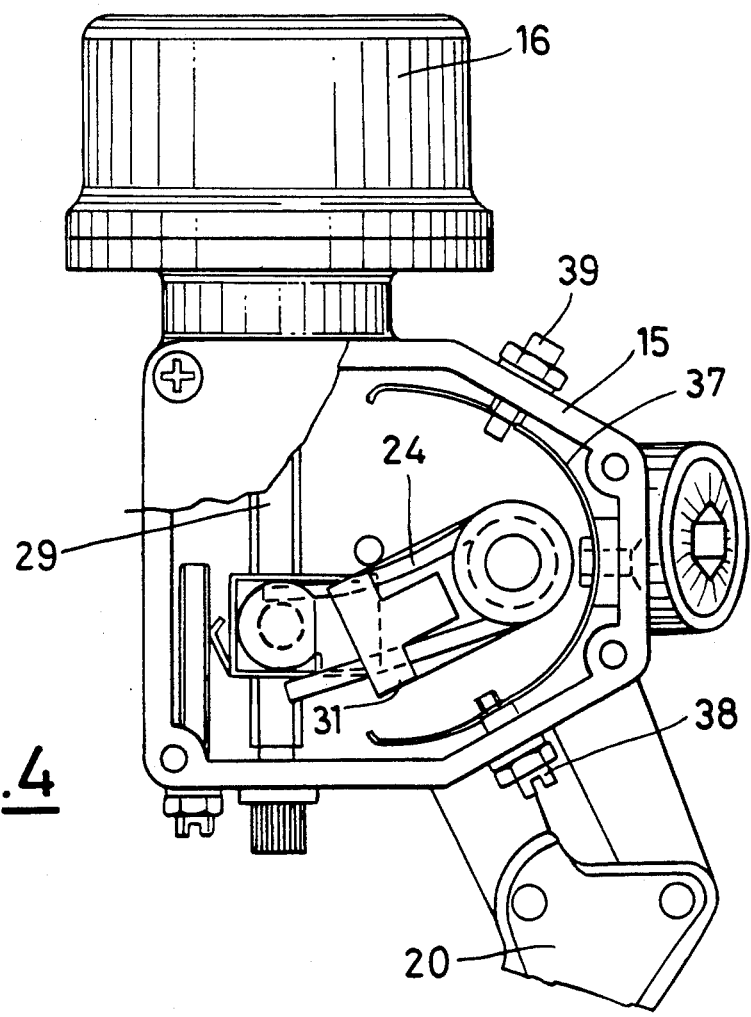
FIG. 4 shows a partial view of the electromechanical transmission of FIG. 2 in a different operating situation.

As mentioned in the introduction, in a gear shifting mechanism, shifting from one sprocket to the other takes place only while the pedals are turning. In addition, to avoid overloading the motor it is preferable that gear changing take place at times of less resistance to movement of the chain among the sprockets. To achieve this there is provided connection of the lever 23 to the carriage 28 through the preloaded springs 24 and 25. Indeed, the springs 24 and 25 are made in such a manner as to supply resistance to bending such that if the motor command occurs under conditions favorable to changing, the lever 23 moves integrally with the carriage 28. But if the stress necessary to move the transmission is for any reason excessive, e.g. because of momentary suspension of pedalling, the spring arms as shown in FIG. 4 bend so that the lever 23 remains stopped while the carriage moves. In this manner the springs will be loaded and, when the movement stress of the transmission decreases to an acceptable level, the springs execute this movement returning to the bent position. In this manner it is ensured that the moving elements of the transmission do not undergo excessive stress.

In addition, thanks to this expedient it is possible to use a stepped motor, which is more easily and economically controlled in position than normal direct current motors, avoiding the loss of steps thereby because of excessive resistance to movement. It is recalled however that in case of accidental loss by the motor of steps for any reason passage through the center line or end position, signalled by the contacts 32, 33, 34, permits the control device 14 to readjust the position information of the motor.

In practice it suffices for the cyclist to command the change with the push buttons 44 or 45. The springs 24, 25 synchronise the movement of the transmission depending on the change of stress so that the gear change takes place under optimal conditions. For example, in case of unforeseen interruption of pedalling or any other hindrance, the motor executes all the same its action and the springs deform to carry out the movement of the transmission as soon as possible.

Figure 5:
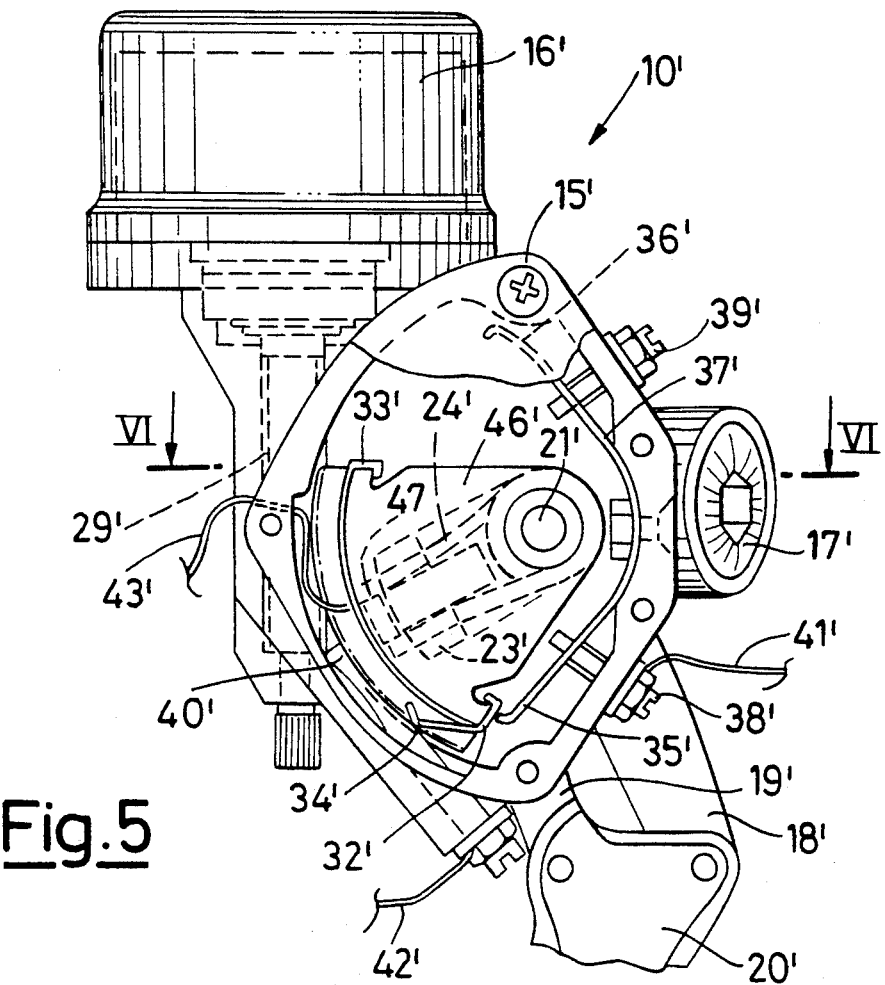
FIG. 5 shows an enlarged schematic partial cutaway view of a second embodiment of a transmission in accordance with the present invention.
Figure 3:
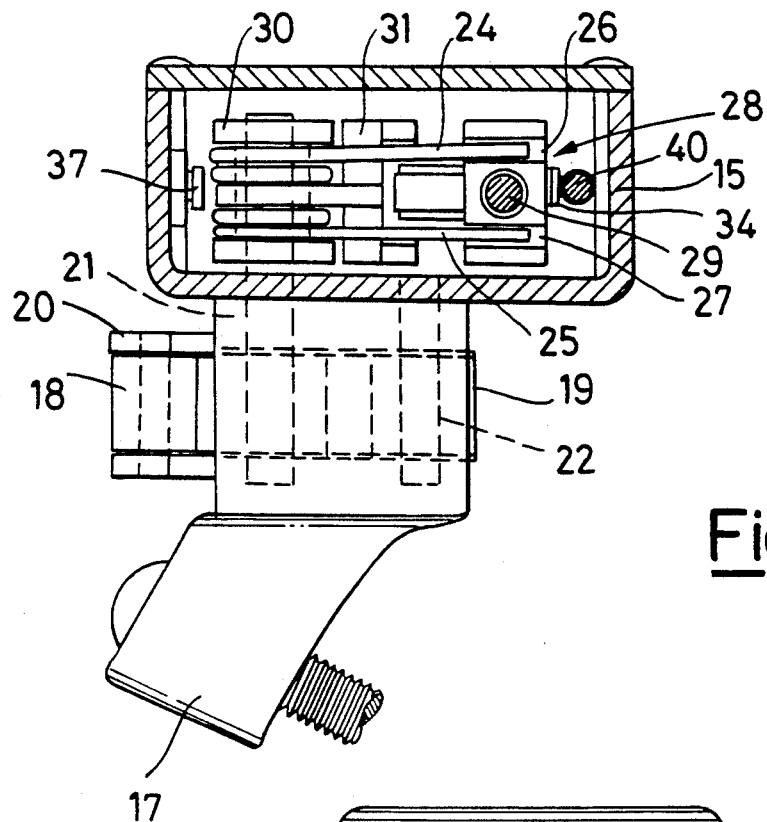
FIG. 3 shows a partial cross section view along plane of cut III—III of FIG. 2.
Figure 6:
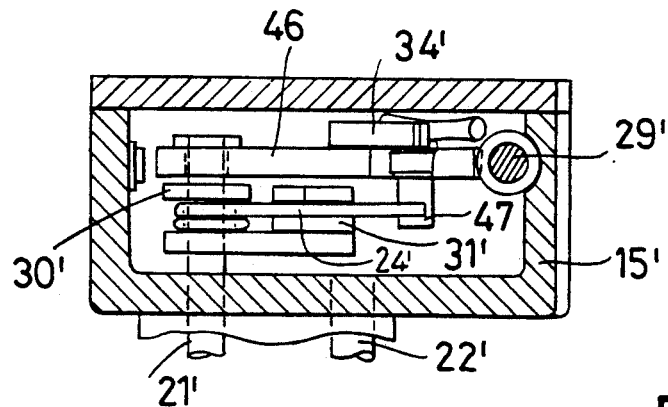
FIG. 6 shows a partial cross section view along plane of cut VI—VI of FIG. 5.

FIGS. 5 and 6 show a second possible embodiment of a gear changing device in accordance with the present invention. Hereinafter the same numbers with the suffix 'prime' are used to indicate elements corresponding to elements with the same number as shown in FIGS. 2 and 3.

The device 10' comprises a cover 15' supported on the bicycle frame by a support 17'. A motor 16' moves a worm 29' which engages a sector of a sprocket 46. The sprocket 46 is pivoted idling around a shaft 21' integral with an arm 18' which together with an arm 19' and a jointing element 20' forms a parallelogram for operation of a transmission analogous to the transmission 11 of FIG. 2 and thus not further shown.

Integral with the shaft 21' is present a lever element 23' as better seen in FIG. 6 which supports a U spring 24' with free ends arranged in contact with the sides of a tooth 47 projecting from the sector gear 46. In this manner there is provided a movement of the parallelogram similar to that described above. If the stress of the movement is sufficiently reduced, operation of the motor and thus movement of the sector gear is followed by an analogous movement of the lever 23' and hence of the transmission. If the stress is excessive the motor 16' moves only the sector gear while the spring 24' bends storing the energy necessary to move the parallelogram when the stress diminishes.

Analogously to what was seen above, the device 10' comprises contacts 32', 33', 34' moving with the sector gear, the contacts 32' and 33' entering into electrical connection with the free ends 35', 36' of a spring 37' when the sector gear is in one of the end of travel positions while the contact 34' runs on a screw 40' for half the movement of the sector gear.

In this manner the information on end of travel and intermediate position necessary to the control device 14 for correct operation of the motor 16' is supplied through the conductors 41', 42', 43'.

It is clear at this point that the purposes have been fulfilled, supplying an electromechanical transmission easily manufactured and allowing accurate and rapid gear shifting without excessive stresses of the mechanical parts and without problems of synchronisation of pedalling and operation of the transmission. In addition, it is easy to verify that a transmission such as described above is readily adaptable to any bicycle with manual transmission merely by replacing the latter with an electromechanical transmission 10, 10'.

Figure 7:
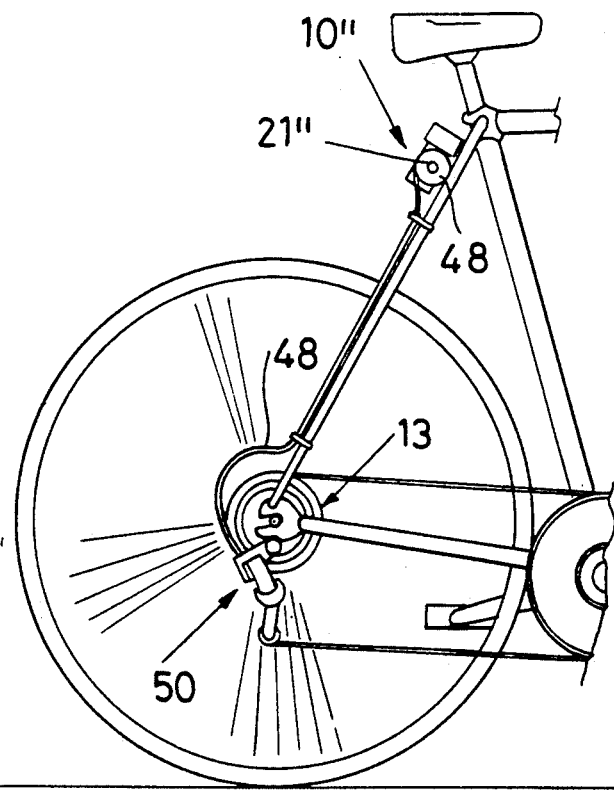
FIG. 7 shows a partial view of a bicycle applying a variant of the embodiments of the above figures.

It can also be imagined to connect between the operating shaft and the parallelogram a mechanism for motion transmission. For example, it is possible to conceive of positioning the actuator in a protected place such as near the seat and controlling through a steel cable the movement of the sprocket change mechanism parallelogram. In this manner it is also conceivable to use as a parallelogram a mechanical sprocket change mechanism of the known art. An example of such a solution is shown schematically in FIG. 7 where there is seen an actuator 10" otherwise similar to one of the actuators 10, 10' described above and having a shaft 21" corresponding to the shafts 21, 21' which moves, in place of the direct connection to a parallelogram, a small pulley 48 or even a simple lever controlling a cable 49 operating a normal mechanical transmission 50.

Such a solution protecting the actuator is particularly suitable for crosscountry or mountain bikes where the lower parts of the bicycle are easily reached by blows. In addition, installation of the electromechanical trasmission on a bicycle already equipped with a conventional transmission is facilitated since it is sufficient to connect the cable 49 to the existing transmission with a clear economy.

Naturally the above description of an embodiment applying the innovative principles of the present invention is given merely by way of example and therefore is not to be taken as a limitation of the patent right claimed here. For example, the exact form and proportions of the elements making up the electromechanical transmission will change with changes in the particular manufacturing requirements. In addition, the control device 14 can include, in addition to the function of gear changing by manual control, other functions such as for example an automatic or semiautomatic transmission based on running parameters of the bicycle such as for example speed or other, as described for example in a copendent patent application filed by the same applicant.

Lastly, the ability of accurately controlling movement of the sprocket change mechanism between the two end positions also permits programming of movements more complicated than merely moving to the position corresponding to engagement of a particular sprocket. Indeed, it has been found that, to make engagement more reliable, the sprocket change mechanism can be commanded to advance slightly beyond the sprocket to then back off after a brief stop to the exact engagement position.

I claim:

1. An electromechanical transmission for bicycles of the type comprising a sprocket change mechanism moving to engage a motion transmission chain opposite a predetermined sprocket of a plurality of coaxial sprockets of different diameters characterized in that it comprises an electric motor controlling through a first rigid mechanism a first element connected through preloaded yielding means to a second moving element of the sprocket change mechanism through another rigid mechanism for movement thereof between end positions corresponding to engagement of the chain with the first and last sprockets of the plurality.

2. Transmission in accordance with claim 1 characterized in that the first mechanism comprises a worm rotated by the motor on which runs a nut screw carriage forming said first element.

3. Transmission in accordance with claim 1 characterized in that the first mechanism comprises a worm rotated by the motor on which engages a sector gear forming said first element.

4. Transmission in accordance with claim 1 characterized in that the second element comprises a rotating shaft for movement of the transmission through the second mechanism, 5. Transmission in accordance with claim 4 characterized in that the second mechanism comprises a parallelogram jointed at one end supporting the sprocket change mechanism and with arms connected for their movement to said shaft.

6. Transmission in accordance with claim 4 characterized in that connection of the parallelogram to said shaft comprises a pivoting pin of an arm of the parallelogram integral with the shaft.

7. Transmission in accordance with claim 5 characterized in that the connection between the shaft and the parallelogram comprises a tierod.

8. Transmission in accordance with claim 1 characterized in that the yielding means comprise at least one spring substantially formed like the letter U with preloaded arms arranged to engage with and react between the first and second elements.

9. Transmission in accordance with claim 4 characterized in that the rotating shaft bears integrally a radial support for receiving and support of the spring which has arm ends engaged in a seat in the first element.

10. Transmission in accordance with claim 9 characterized in that the seat comprises a part received between the ends of the arms.

11. Transmission in accordance with claim 9 characterized in that the spring has the base of the U in a spiral wound coaxially with the rotating shaft.

12. Transmission in accordance with claim 3 characterized in that the sector gear is supported to rotate freely coaxially with said shaft.

13. Transmission in accordance with claim 9 characterized in that the springs are two side by side springs.

14. Transmission in accordance with claim 1 characterized in that it comprises limit switch means sending to an electronic circuit controlling the motor a signal of reaching by the first element at least end positions corresponding to the end positions of the sprocket change mechanism.

15. Transmission in accordance with claim 14 characterized in that the limit switch means comprise fixed electrical contact means arranged near said end positions of the first element and corresponding moving electrical contact elements arranged on the first element to enter in electrical connection with one of the fixed elements upon reaching the corresponding end position.

16. Transmission in accordance with claim 15 characterized in that the fixed elements consist of free ends of a single lamination of conducting material.

17. Transmission in accordance with claim 16 characterized in that the lamination is fixed centrally and engages near its ends with screws for adjusting the position of said connection ends with the moving contact elements.

18. Transmission in accordance with claim 15 characterized in that the moving elements are electrically connected together.

19. Transmission in accordance with claim 1 characterized in that it comprises means for detection of a passage of the first element in a predetermined position intermediate between end positions of movement thereof.

20. Transmission in accordance with claim 18 characterized in that the detection means comprise another electrical contact element rubbing in electrical connection with a respective fixed surface between one of the end positions and the intermediate position.

21. Transmission in accordance with claim 1 characterized in that the electric motor is a stepped motor.

22. Transmission in accordance with claim 8 characterized in that the rotating shaft bears integrally a radial support for receiving and support of the spring which has arm ends engaged in a seat in the first element.

23. Transmission in accordance with claim 4 characterized in that the sector gear is supported to rotate freely coaxially with said shaft.

* * * * *